United States Patent [19]

Carlin

[11] Patent Number: 4,535,476
[45] Date of Patent: Aug. 13, 1985

[54] OFFSET GEOMETRY, INTERFERENCE CANCELING RECEIVER

[75] Inventor: James W. Carlin, Holmdel, N.J.

[73] Assignee: AT&T Bell Laboratories, Murray Hill, N.J.

[21] Appl. No.: 446,022

[22] Filed: Dec. 1, 1982

[51] Int. Cl.³ .......................... H04B 1/12; H04B 15/00
[52] U.S. Cl. ...................................... 455/63; 455/273;
455/276; 455/278; 455/304
[58] Field of Search ............... 455/278, 273, 276, 25,
455/60, 63, 295, 303, 304; 343/100 LE, 379,
380, 381, 383, 384

[56] References Cited

U.S. PATENT DOCUMENTS

| | | | |
|---|---|---|---|
| 3,020,543 | 2/1962 | Li . | |
| 3,167,761 | 1/1965 | Parquier | 343/379 |
| 3,914,768 | 10/1975 | Ohm | 343/779 |
| 3,953,858 | 4/1976 | Ohm | 343/779 |
| 4,236,161 | 11/1980 | Ohm | 343/781 |
| 4,283,695 | 8/1981 | Steinberger | 455/283 |
| 4,320,535 | 3/1982 | Brady et al. | 455/278 |
| 4,384,366 | 5/1983 | Kaitsuka | 455/278 |

Primary Examiner—Marc E. Bookbinder
Attorney, Agent, or Firm—Gregory C. Ranieri; Robert O. Nimtz

[57] ABSTRACT

Adaptive interference cancellation is provided by an offset geometry, multiple feedhorn, single main reflector antenna in combination with uplink and downlink cancellation circuits. The antenna is coupled to the cancellation circuits via several duplexer and amplifier circuit combinations. A dither control circuit monitors dither signal generated in one cancellation circuit to ensure a predetermined integral relationship existing between the dither signal frequency and a round trip signal delay.

8 Claims, 2 Drawing Figures

OFFSET GEOMETRY, INTERFERENCE CANCELING RECEIVER

TECHNICAL FIELD

This invention relates to the field of communications technology and, more particularly, to interference cancellation in a receiver.

BACKGROUND OF THE INVENTION

In existing communication systems, interference from neighboring transmitter facilities is seldom a problem at any single receiver location because of strict system design rules. For satellite systems, one such design rule is an intersatellite spacing of not less than 4 degrees longitude on the geostationary arc.

A reduction of the intersatellite spacing to 2 degrees longitude has a positive effect of increasing the number of satellites which could be placed in orbit within the limited area on the geostationary arc. However, this positive effect is substantially outweighed by the concomitant degradation of reception caused by increased interference from adjacent satellite repeaters. As presently designed, earth station receivers are not well equipped to reject or suppress this increased interference. This is a direct result from the use of the system design rules mentioned above which have been established in order to avoid even the first occurrence of interference from adjacent transmitters.

SUMMARY OF THE INVENTION

Interference from adjacent satellites longitudinally spaced apart by an amount substantially less than 4 degrees is efficiently canceled by utilizing a receiver arrangement including an offset geometry antenna having multiple feedhorns focused on one satellite of interest and adjacent interfering satellites in combination with an adaptive interference cancellation circuit. Each antenna feed generates a sufficiently clean replica of the interference from the corresponding satellite. This, in turn, allows the cancellation circuit to provide approximately broadband cancellation of the interference.

According to another aspect of the invention, appropriately controlled uplink and downlink cancellation circuits cooperate in a closed loop system through the satellite of interest to increase the isolation between message signals from the one satellite of interest and interference from adjacent satellites.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

The present invention is designed to operate in a communications system environment wherein a message source and a source of interference are located sufficiently close together that their respective transmitted signals are received by a single receiver. In a satellite communications system, the message and interference sources are satellite repeaters. An antenna directed toward the message source, that is, the desired satellite, receives a composite downlink signal including received downlink message signal $M_d(t)$ and components of downlink interference signal, $\alpha I_d(t)$. Interference signal $I_d(t)$ is comprised of message signals from many other earth stations, which are designated $I(t)$, as well as components of a previous uplink message signal $\beta M_u(t-\tau)$ from the earth station of interest. The description which follows explains the use of the present receiver arrangement in an earth station associated with a satellite communication system for suppressing components of the interfering signal $I_d(t)$ concurrently received from the same or a different direction with the desired downlink message signal $M(t)$.

It is to be understood that the following description is exemplary only for purposes of exposition and not for purposes of limitation. It can readily be appreciated that the present arrangements can also be used in the satellite repeater or with terrestrial microwave systems for effecting interference cancellation.

Figure 1:
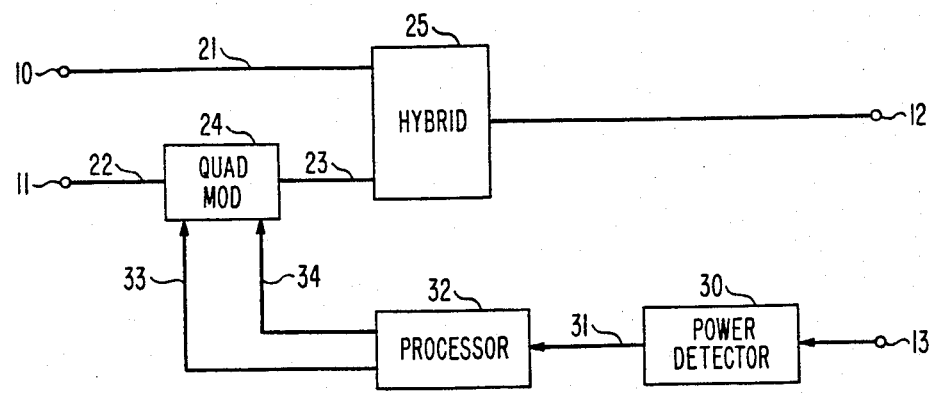
FIG. 1 shows a block diagram of an interference cancellation circuit adapted for use with the present invention.
Figure 2:
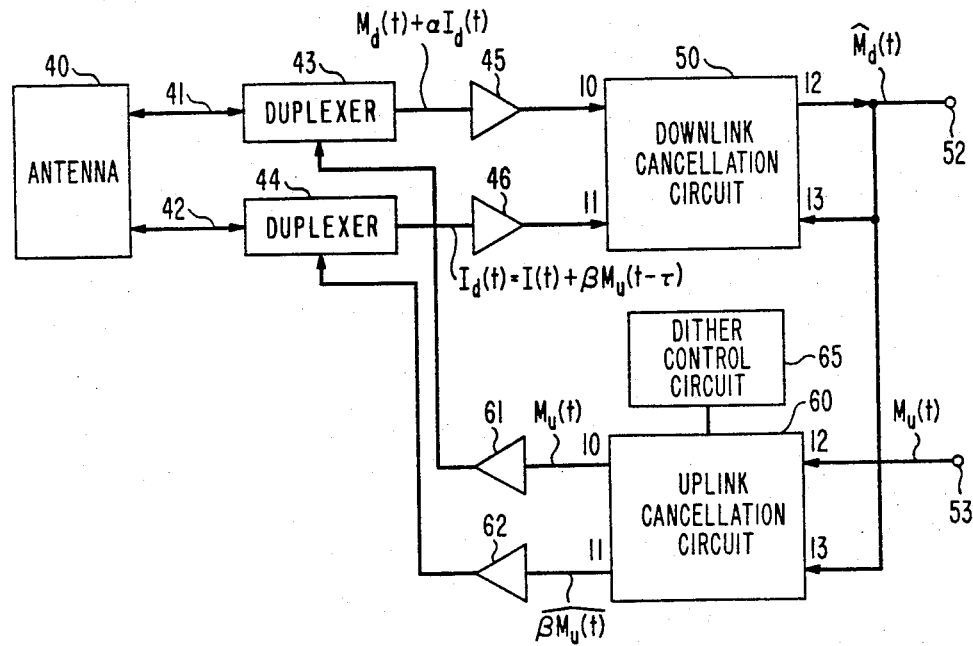
FIG. 2 shows a block diagram of the offset geometry, adaptive interference canceling receiver arrangement.

FIG. 1 illustrates a block diagram of an adaptive interference cancellation circuit employed in accordance with the present invention. The cancellation circuit shown in FIG. 1 includes quadrature modulator 24, hybrid 25, and a feedback control portion comprised of power detector 30 and processor 32 as well as terminals 10 through 13. The cancellation circuit is reversible in that it is capable of operating in either a forward mode for downlink cancellation (FIG. 2, circuit 50) or a reverse mode for uplink cancellation (FIG. 2, circuit 60). In the forward mode, terminals 10 and 11 are input terminals while terminal 12 is an output terminal. Likewise, in the reverse mode, terminals 10 and 11 are output terminals while terminal 12 is an input terminal. Regardless of the mode, terminal 13 is the input terminal for the feedback control portion of the cancellation circuit.

When properly connected in the entire circuit arrangement in accordance with the invention, the cancellation circuit is capable of performing either downlink cancellation to eliminate components of downlink interference signal $\alpha I_d(t)$ from the received composite downlink signal or uplink cancellation to eliminate components of a previous uplink message signal $\beta M_u(t-\tau)$ from downlink interference signal $I_d(t)$. Operation of the cancellation will be explained below in greater detail in reference to FIG. 2.

FIG. 2 illustrates a block diagram of the offset geometry, interference canceling receiver arrangement. The receiver arrangement includes antenna 40, duplexers 43 and 44, amplifiers 45, 56, 61 and 62, cancellation circuits 50 and 60, and dither control circuit 65.

Antenna 40 is a multiple feed, offset geometry antenna. An exemplary offset geometry antenna is one of an offset Cassegrainian design which avoids aperture blockage common to antennas with an axially symmetric design. It should be noted that a similar arrangement employing an axially symmetric antenna will also provide cancellation of adjacent satellite interference with a small loss in gain due to the additional aperture blockage from the multiple feedhorns.

For the offset Cassegrainian antenna, conventional reflective and focal surfaces are positioned asymmetrically with respect to the antenna aperture axis. This antenna design is characterized by disposing a main reflector entirely on one side of an imaginary plane. A subreflector and a focal surface are disposed on the other side of the imaginary plane opposite the main reflector. To accommodate multiple satellite access, a plurality of feedhorns are disposed on a focal surface. The feedhorns are directed toward the subreflector for transmitting and receiving electromagnetic energy. In the embodiment shown in FIG. 2, a main feedhorn would be focused on the desired message source satellite while an auxiliary feedhorn would be focused on the interfering satellite. Accordingly, lead 41 is connected to the main feedhorn directed at the desired satellite and lead 42 is connected to the auxiliary feedhorn directed towards the interfering satellite.

Detailed explanations of the offset Cassegrainian antenna adaptable for use as antenna 40 can be found in U.S. Pat. Nos. 3,914,768, 3,953,858 and 4,236,161, all issued to E. A. Ohm.

Duplexers 43 and 44 and amplifiers 45, 46, 61 and 62 interface antenna 40 with cancellation circuits 50 and 60. The interface provides two distinct paths for signal reception or transmission, namely, the downlink path and the uplink path.

On the downlink path, received signals on leads 41 and 42 are input to duplexers 43 and 44, respectively. Received composite downlink signal $M_d(t)+\alpha I_d(t)$ is output by duplexer 43 and amplified to a predetermined level by low noise amplifier 45. The amplified output signal from amplifier 45 is applied to terminal 10 of downlink cancellation circuit 50. Downlink interference signal $I_d(t)$ is output by diplexer 44 and then amplified to a predetermined level by low noise amplifier 46. The output signal from amplifier 46 is applied to terminal 11 of downlink cancellation circuit 50.

On the uplink path, uplink message signal $M_u(t)$ (terminal 10) and estimated uplink cancellation signal $\beta\widehat{M_u}(t)$ (terminal 11) are output by uplink cancellation circuit 60 to high power amplifiers 61 and 62 for amplification to a predetermined level. Amplified output signals from amplifiers 61 and 62 are supplied to duplexers 43 and 44, respectively, for transmission through antenna 40. Amplifiers 45, 46, 61 and 62 and diplexers 43 and 44 can comprise any suitable circuit or arrangement capable of performing the functions described.

As described above, signals in the downlink path traverse the duplexer/amplifier interface and are input to downlink cancellation circuit 50. Downlink cancellation circuit 50 is comprised of the adaptive interference cancellation circuit, as shown in FIG. 1, connected for forward mode operation. Reference numerals of the terminals are shown in FIG. 2 for orientation purposes. The following description of cancellation circuits 50 and 60 will make use of the reference numerals designated in FIGS. 1 and 2 without specifically indicating the particular associated figure.

In downlink cancellation circuit 50, terminal 10 is adapted to receive composite downlink signal $M_d(t)+\alpha I_d(t)$ on lead 21, while input terminal 11 is adapted to receive downlink interference signal $I_d(t)$ on lead 22. The signal on lead 22 is transmitted through quadrature modulator 24 for adjustment of the phase and amplitude of each of the quadrature components of the downlink interference signal.

An exemplary quadrature modulator 24 comprises a quadrature hybrid which divides downlink interference signal $I_d(t)$ into two quadrature phased components which are transmitted as separate output signals. Each of the quadrature phased components are modulated in corresponding mixers by control signals from processor 32 on respective leads 33 and 34. The two components from the mixers are then recombined in a hybrid to generate the appropriately modulated in-phase and quadrature interference signals on lead 23. It is to be understood that the components of the exemplary quadrature modulator 24 can comprise any suitable circuit which is known. Additionally, any other suitable quadrature modulator which is known may also be used.

As stated above, the output signal from quadrature modulator 24 provides an estimated interference cancellation signal which is combined in hybrid circuit 25 with the signal on lead 21 to provide a corrected signal, which is designated $\widehat{M}_d(t)$, at the output of circuit 25. Signal $\widehat{M}_d(t)$ is an estimate of the downlink message signal which is substantially free of interference from signal $\alpha I_d(t)$. It should be clear to those skilled in the art that downlink cancellation circuit 50 is capable of canceling signal $I(t)$ in interference signal $\alpha I_d(t)$. However, circuit 50 alone is not capable of completely canceling signal $\beta M_u(t-\tau)$.

Terminal 12 is the output terminal for downlink cancellation circuit 50 and terminal 52 is an output terminal for the estimated downlink message signal $\widehat{M}_d(t)$.

Terminal 13 acts as an input terminal for the feedback control loop in downlink interference cancellation circuit 50. In most types of operation, the signal at terminal 12 is applied to terminal 13. See, for example, downlink cancellation circuit 50 in FIG. 2. However, there exist those cases where some other signal is supplied to the feedback control loop as in the uplink cancellation circuit 60.

In downlink cancellation circuit 50, the estimated downlink message signal $\widehat{M}_d(t)$ at terminal 12 is input to terminal 13 and thereby applied to the input of power detector 30. Power detector 30 generates an output signal on lead 31 which is proportional to the magnitude squared of the signal from terminal 13. More particularly, power detector 30 obtains the envelope of the power of the signal from terminal 13. The power detector output signal on lead 31 is at baseband frequencies and generally lacks coherence with either the message signal or the interference signal. It is to be understood that power detector 30 can be an IF power detector together with an appropriate down-converter and filter or, simply, an RF power detector or another suitable circuit which is known and functions as described.

The power detector output signal 31 is applied to the input of processor 32 which generates control signals that are transmitted over leads 33 and 34 to quadrature modulator 24. Processor 32 employs the control signals to appropriately vary the phase and amplitude of interference signal $I_d(t)$ sample received via terminal 11. Processor 32 also generates a downlink dither signal at frequency $f_d$ which is added to the control signals to vary the phase and amplitude of the residual interference in the estimated downlink message signal $\widehat{M}_d(t)$ from hybrid circuit 25 to achieve maximal interference cancellation. The dither signal can be a square wave signal at a baseband frequency. An exemplary processor 32 which generates and employs a dither signal is described in U.S. Pat. No. 4,283,795 issued to M. Steinberger on Aug. 11, 1981 and U.S. Pat. No. 4,320,535 issued to D. Brady et al. on Mar. 16, 1982.

As described above, signals in the uplink path are input to uplink cancellation circuit 60, then through the amplifier/diplexer interface to antenna 40. Uplink cancellation circuit 60 is comprised of the adpative interference cancellation circuit, as shown in FIG. 1, connected for reverse mode operation. Terminal reference numerals are shown on circuit 60 for orientation purposes.

In uplink cancellation circuit 60, terminal 12 is adapted to receive uplink message signal $M_u(t)$ from terminal 53. Uplink message signal $M_u(t)$ is transmitted through hybrid 25 wherein a portion of signal $M_u(t)$ is diverted onto lead 23 as input to quadrature modulator 24. The remaining portion of signal $M_u(t)$ is input via lead 21 and terminal 10 to amplifier 61.

An exemplary quadrature modulator 24 comprises a quadrature hybrid which divides uplink message signal $M_u(t)$ on lead 23 into two quadrature phased components which are transmitted as separate output signals. Each of the quadrature phased components are modulated in corresponding mixers by control signals from processor 32 on respective leads 33 and 34. The two components from the mixers are then recombined in a hybrid to generate an estimated uplink cancellation signal at terminal 11. The estimated uplink cancellation signal $\beta \hat{M_u}(t)$ is derived from an estimate of the interfering components of the previous uplink message signal $M_u(t-\tau)$ present in the downlink interference signal $I_d(t)$. $\tau$ is the round-trip delay measured on the closed loop through the satellite.

Terminal 13 acts as an input terminal for the feedback control loop in uplink interference cancellation circuit 60. In uplink cancellation circuit 60, the estimated downlink message signal $\hat{M}_d(t)$ from terminal 12 of downlink cancellation circuit 50 is applied to terminal 13 and power detector 30 of uplink cancellation circuit 60.

Power detector 30 in uplink cancellation circuit 60 generates an output signal on lead 31 which is proportional to the magnitude squared of the signal from terminal 13. More particularly, power detector 30 obtains the envelope of the power of the estimated downlink message signal from terminal 13. The power detector output signal on lead 31 is at baseband frequencies and generally lacks coherence with either the message signal or the interference signal. It is to be understood that power detector 30 can be an IF power detector together with an appropriate down-converter and filter or, simply, an RF power detector or another suitable circuit which is known and functions as described.

The power detector output signal in uplink cancellation circuit 60 is applied to the input of processor 32 which generates control signals that are transmitted over leads 33 and 34 to quadrature modulator 24. Processor 32 employs the control signals to appropriately vary the phase and amplitude of uplink message signal $M_u(t)$ on lead 23. Processor 32 also generates an uplink dither signal at frequency $f_u$. The dither signal is added to the control signals to vary or jitter the phase and amplitude of the uplink signal $M_u(t)$ from hybrid circuit 25 to achieve maximal interference cancellation in the downlink path of components of the previous message signal $\beta M_u(t-\tau)$ from the downlink interference signal $I_d(t)$. Frequency $f_u$ for the uplink dither signal is related integrally to the round trip signal delay $\tau$ as follows, $\tau = n/f_u$, n is an integer. Also, the frequency of the uplink dither signal is not equal to the frequency of the downlink dither signal but is related properly to cause both dither signals to be orthogonal with respect to each other. As stated above, an exemplary processor 32 which generates and employs a dither signal is described in U.S. Pat. No. 4,283,795 issued to M. Steinberger on Aug. 11, 1981 and U.S. Pat. No. 4,320,535 issued to D. Brady et al. on Mar. 16, 1982.

Dither control circuit 65 is connected to processor 32 in uplink cancellation circuit 60. Dither control circuit 65 monitors the dither signal generated by the processor in circuit 60 and ensures that the uplink dither signal maintains the proper relationship with respect to the downlink dither signal and the round trip delay. Dither control circuit 65 synchronizes the uplink feedback control circuit in circuit 60 by maintaining a closed loop (uplink through downlink) signal delay which is an integral number of periods of the uplink dither signal. It is to be understood that dither control circuit 65 can be realized by a delay phase locked loop arrangement or another suitable circuit which is known and performs the functions as described.

Although the present invention has been described as advantageous in a reduced intersatellite spacing environment, it also provides a benefit where no reduction of intersatellite spacing is contemplated. With present spacings of 4 degrees longitude, satellites generally provide beam coverage wherein the beams have equal effective isotropic radiated power (EIRP). This makes it difficult to introduce spot beam coverage in an area coverage system because the spot beam coverage has a higher EIRP. The present invention would permit intermixing of spot beam and area coverages without degrading overall performance as measured by the receiver.

It is to be understood that the specific embodiment described herein is merely illustrative of the general principles of the instant invention. Numerous other structural arrangements and modifications may be devised in light of this disclosure by those skilled in the art without departing from the spirit and scope of this invention. In particular, a plurality of auxiliary feedhorns could be arranged in the focal plane of the antenna to receive interference signals from a corresponding plurality of interfering satellites. Accordingly, this would necessitate a corresponding increase in the number of uplink and downlink cancellation circuits.

What is claimed is:

1. A signal communications arrangement including antenna means for receiving signals from a desired signal source and from an interference signal source located adjacent to the desired signal source, said antenna means comprising a main feedhorn which is focused on said desired signal source and an auxiliary feedhorn which is focused on said interference signal source, the antenna means being responsive to signals from the desired signal source for generating a composite signal including a desired message signal and a first interference signal, the antenna means also being responsive to signals from the interference signal source for generating a second interference signal comprising the first interference signal, combining means including a first feedback control circuit responsive to a representation of the desired message signal for generating appropriate control signals to cause variations of the phase and amplitude of the first interference signal, means responsive to the control signals for adjusting the phase and amplitude of the first interference signal, and a combiner for combining the adjusted first interference signal with the composite signal to generate said representation of the desired message signal, and signal translation means including a first duplexer coupled to the antenna means for interfacing the composite signal received therefrom, a first amplifier means for adjusting the amplitude of the composite signal to a predetermined level, a second duplexer coupled to the antenna means for interfacing the second interference signal received therefrom, and a second amplifier means for adjusting the amplitude of the second interference signal to a predetermined level.

2. A signal communications arrangement including antenna means for receiving signals from a desired signal source and from an interference signal source located adjacent to the desired signal source, the antenna means being responsive to signals from the desired signal source for generating a composite signal including a desired message signal and a first interference signal, the antenna means also being responsive to signals from the interference signal source for generating a second interference signal comprising the first interference signal, combining means including a first feedback control circuit responsive to a representation of the desired message signal for generating appropriate control signals to cause variations of the phase and amplitude of the first interference signal, means responsive to the control signals for adjusting the phase and amplitude of the first interference signal, and a combiner for combining the adjusted first interference signal with the composite signal to generate said representation of the desired message signal, signal translation means for interfacing and amplifying the signals from the antenna means to the combining means, the antenna means being further adapted for transmitting signals to the desired signal source and to the interference source, the combining means including a second feedback control circuit responsive to the representation of the desired message signal for generating appropriate control signals to cause controllable variations of the phase and amplitude of a portion of a supplied message signal, branching means responsive to the supplied message signal for generating an output signal representing said portion of the supplied message signal, means responsive to the control signals from the second feedback control circuit for adjusting the phase and amplitude of said portion of the supplied message signal to generate a third interference signal and the signal translation means further includes means for amplifying the third interference signal and the supplied message signal and for interfacing the third interference signal and the supplied message signal to the antenna means.

3. The arrangement as defined in claim 2 wherein the first feedback control circuit includes first detector means for generating an output signal representative of the power envelope of the representation of the desired message signal and first processor means for generating the respective control signals in response to the output signal of the first detector means.

4. The arrangement as defined in claim 3 wherein the second feedback control circuit includes second detector means for generating an output signal representative of the power envelope of the representation of the desired message signal and second processor means for generating the respective control signals in response to the output signal of the second detector means.

5. The arrangement as defined in claim 4 wherein the first processor means is also capable of dithering its respective control signals at frequency $f_d$, and wherein the second processor means is also capable of dithering its respective control signals at frequency $f_u$, so that frequency $f_u$ is not equal to frequency $f_d$.

6. The arrangement as defined in claim 5 wherein the combining means includes a dither control circuit means coupled to the second processor means for adjusting frequency $f_u$ to exhibit an integral relationship with a round trip delay, $\tau$, as $\tau = n/f_u$ and n is an integer.

7. The arrangement as defined in claim 6 further comprising a first duplexer coupled to the antenna means for interfacing with the composite signal received therefrom, a first amplifier means for adjusting the amplitude of the composite signal to a predetermined level, a second amplifier for adjusting the amplitude of the supplied message signal to a predetermined level, the first duplexer for interfacing with an output signal of the second amplifier to the antenna means.

8. The arrangement as defined in claim 7 further comprising a second duplexer coupled to the antenna means for interfacing with the second interference signal therefrom, a third amplifier means for adjusting the amplitude of the second interference signal to a predetermined level, a fourth amplifier means for adjusting the amplitude of the third interference signal to a predetermined level, and the second duplexer for interfacing with an output signal of the fourth amplifier to the antenna means.

* * * * *